United States Patent [19]

Stawinski

[11] Patent Number: 4,851,044

[45] Date of Patent: Jul. 25, 1989

[54] FIRE PROOFING COMPOSITION

[76] Inventor: Henry P. Stawinski, 15819 Bond Mill Rd., Laurel, Md. 20707

[21] Appl. No.: 55,964

[22] Filed: Jun. 1, 1987

Related U.S. Application Data

[63] Continuation-in-part of Ser. No. 706,413, Feb. 27, 1985, abandoned.

[51] Int. Cl.$^4$ ............................................. C09D 5/16
[52] U.S. Cl. ................................... 106/18.12; 252/62
[58] Field of Search ......... 252/62; 106/18.12, DIG. 3

[56] References Cited

U.S. PATENT DOCUMENTS

| | | | |
|---|---|---|---|
| Re. 19,919 | 4/1936 | Bechtner | 106/86 |
| 1,430,085 | 9/1922 | Keeth | 106/DIG. 3 |
| 2,311,588 | 2/1943 | Denning | 106/DIG. 3 |
| 2,939,794 | 6/1960 | Wilkinson | 106/18.11 |
| 4,043,862 | 8/1977 | Roberts | 428/334 |
| 4,544,409 | 10/1985 | Daussan et al. | 106/104 |

*Primary Examiner*—Theodore Morris
*Attorney, Agent, or Firm*—Sughrue, Mion, Zinn, Macpeak & Seas

[57] ABSTRACT

A fire proofing composition comprising (1) 60 to 85 percent by weight exfoliated vermiculite, (2) 1 to 20 percent by weight clay, (3) 1 to 20 percent by weight silica, (4) 1 to 20 percent by weight mica, (5) 1 to 20 percent by weight biotite, (6) 5 to 20 percent by weight adhesive and, if necessary, (7) 1 to 20 percent by weight water as a thinning agent.

9 Claims, No Drawings

FIRE PROOFING COMPOSITION

CROSS-REFERENCE TO RELATED APPLICATIONS

This is a continuation-in-part of application Ser. No. 706,413 filed Feb. 27, 1985 now aband.

FIELD OF THE INVENTION

The present invention relates to a fire proofing composition which is useful when applied to various substrates, particularly porous substrates, such as wood, metal, concrete, and fiberglass.

BACKGROUND OF THE INVENTION

Fire-resistant coating compositions and agents are well known, for example, as disclosed in U.S. Pat. Nos. 2,939,794; 4,043,862; 4,095,985; and 4,172,235; Great Britain Pat. No. 1,006,917; Canadian Pat. No. 624,479; Japanese Pat. No. 53-64230 and German Pat. No. 2,147,627. However, the fire-resistant coating compositions described in the above references are disadvantageous as discussed in more detail below.

U.S. Pat. No. 2,939,794 discloses a fire-resistant coating composition consisting of asphalt; a volatilizable diluent such as kerosene and naphtha; asbestos; mica; expanded vermiculite; and alkaline metal tetraborate. The asphalt is heated to fluidity and mixed with the volatilizable diluent to form the asphalt cutback. The cutback is then heated and mixed with the vermiculite, asbestos, mica and alkaline metal tetraborate. This composition is disadvantageous in that the use of naphtha and kerosene poses a fire risk in the preparation of the composition and curing of the composition requires several weeks until the volatilizable component has evaporated off. Further, in preparing this composition expensive equipment such as heating type kettles are required in order to mix the composition.

U.S. Pat. No. 4,043,862 relates to a fire-resistant vermiculite composition board comprising expanded vermiculite, ceramic clay, hydrated cellulosic gel, defiberized wood and starch. However, this composition is disadvantageous since, upon heating, the vermiculite expands which can allow for penetration of the fire. Further, the cellulose, starch and other organic components of the board decompose into combustible gases when exposed to high temperature. These gases can ignite and help spread the fire. Moreover, as a composition board, it has limited fire proofing utility.

U.S. Pat. No. 4,095,985 teaches a fire proofing agent comprising an aqueous mixture of lithium mica, wollastonite, aluminum trihydrate, nepheline syenite and soda bicarbonate. However, this composition is disadvantageous since it expands under intense heat and thus does not provide a sufficient fire proofing effect.

U.S. Pat. No. 4,172,735 discloses flame-resistance foams of regenerated cellulose and a filler uniformly dispersed in the cellulose, wherein the filler is selected from the group consisting of kieselguhr and mica, and wherein the mica is biotite or vermiculate. However, these foams are disadvantageous in that the presence of water causes spoiling which limits its application to dry areas. In addition, the cellulose employed therein shrinks during drying which causes an unevenness in the surface and compaction.

Great Britain Pat. No. 1,006,917 relates to a fire proof heat-insulating composition comprising asbestos fibers, exfoliated vermiculite, kieselguhr and sodium silicate. However, this composition is disadvantageous because of the harmful effects of the asbestos fibers employed therein. In addition, this composition is only useful for low-density fires. A low-density fire is one that is not intensified with combustible liquids (e.g., gasoline) or gases under pressure (a pile of paper lit with a match is considered to be a low-density fire).

Canadian Pat. No. 624,479 teaches a fire-retardant coating composition comprising unexpanded vermiculite, a polymeric material, a plasticizer, a chlorinated resin, and a filler such as mica and asbestos. However, this composition is disadvantageous because of the harmful effects of the asbestos employed therein. Further, this composition does not provide for protection over a long period of time because, when heated, the coating expands and separates from the substrate.

Japanese Pat. No. 53-64230 discloses a fire-resistant material comprising perlite, vermiculite, inorganic filler, reenforcement and a sodium salt binder such as sodium silicate and sodium glycolate cellulose. However, this composition is disadvantageous because perlite employed therein decomposes when exposed to heat and is not an effective filler. Further, the cellulose employed therein will not stand up against intense heat.

German Pat. No. 2,147,627 relates to incombustible molding batches comprising sodium dioxide, pottery clay, silicate, kieselguhr, diaspore, flue dust, calcium oxide, calcium carbonate gypsum, asbestos fibers and a thermoplastic or thermosetting resin or an alkyl cellulose rein which is soluble or swellable in water. However, this composition is disadvantageous in that it employs asbestos which is hazardous and the composition is only used for molding and thus cannot be employed as a direct contact fire proofing agent.

SUMMARY OF INVENTION

Accordingly, an object of the present invention is to provide a fire proofing composition which is useful when employed on a variety of substrates, particularly porous substrates, such as wood, metal, concrete and fiberglass.

Another object of the present invention is to provide a fire proofing composition which does not release noxious gases and fumes when heated.

An additional object of the present invention is to provide a fire proofing composition which is simple to prepare and has a short curing time.

Still another object of the present invention is to provide a fire proofing composition which does not expand when heated and thus prevents fire from spreading.

The above objects of the present invention have been met by a fire proofing composition comprising
(1) 60 to 85 percent by weight exfoliated vermiculite,
(2) 1 to 20 percent by weight clay,
(3) 1 to 20 percent by weight silica,
(4) 1 to 20 percent by weight mica,
(5) 1 to 20 percent by weight biotite,
(6) 5 to 20 percent by weight adhesive and, if necessary,
(7) 1 to 20 percent by weight water as a thinning agent.

DETAILED DESCRIPTION OF THE INVENTION

The fire proofing composition of the present invention not only acts as a flame retardant but also acts as an insulation in that it will retain radiated heat when used in a furnace or oven.

The exfoliated vermiculite employed in the present invention can be used in an amount of from 60 to 85 percent by weight, preferably 65 to 80 percent by weight. Exfoliated vermiculite is commercially available from W.R. Grace Company.

As used herein "clay" refers in general to aluminosilicate minerals which are well known in the art. The particular clay employed in the present invention is not critical thereto.

The amount of clay to be employed in the present invention is from 1 to 20 percent by weight, preferably 1 to 5 percent by weight.

The amount of silica to be employed in the present invention is from 1 to 20 percent by weight, preferably 1 to 5 percent by weight.

The amount of mica to be employed in the present invention is from 1 to 20 percent by weight, preferably 1 to 5 percent by weight.

The amount of biotite to be employed in the present invention is from 1 to 20 percent by weight, preferably 1 to 5 percent by weight.

The adhesive which can be employed in the present invention can be any known organic adhesive, or inorganic adhesive. Examples of the organic adhesives which can be employed in the present invention include thermoplastic polymers or copolymers such as polyvinyl acetate resins, copolymers of polyvinyl acetate resins and acrylic resins. Specific examples thereof include the commercially available Borden's PolyCo 571 and Polyco 117-50 as polyvinyl acetate homopolymers and Rohm and Haas' Rhoplex AC-22 and AC-33, Basf Corp's Acronol 290D and Essential Chemical Corp's Eccotex 282 as acrylic resins, and Basf Corp's Propiofan Vinyl Propionate Copolymer Dispersion 5D and PVO International, Inc.'s Polidene Vinylidene Chloride Copolymer Emulsion 33-075. C.M.A. adhesive obtained from Franklin Chemical Industries is preferably employed. The commercially available Elmer's aliphatic resin, common white glue and L.G.H. liquid hide glue and plaster of Paris can also be employed. Examples of inorganic adhesives which can be employed in the present invention include Grade N and Grade RU adhesives which are commercially available for P.Q. Corporation. In addition, the above-described adhesives can be employed in combination.

The amount of adhesive employed in the present invention is from 5 to 20 percent by weight, preferably 5 to 10 percent by weight.

If necessary, water can be employed in an amount of from 1 to 20 percent, preferably 1 to 5 percent by weight, as a thinning agent depending on the substrate onto which the fire proofing composition is to be applied.

The components of the present invention can be mixed together in any order to achieve the composition of the present invention. It is preferable to first process the dry materials through a mesh having a pore size of 0.40 mm to produce a grain size of about 0.15 to 0.25 mm, and then add the adhesive and water at a temperature of about 35° to 95° C.

In the present invention, all of the solid components are treated in such a manner that they have a uniform grain size ranging from 0.15 mm to 0.40 mm, preferably 0.15 to 0.25 mm in diameter.

The composition of the present invention can be applied on various substrates such as fiber board, steel beams, concrete, plastic, electrical wire, wood, fiberglass, etc. depending upon the desired use.

The composition of the present invention can be applied to the substrates by means of a brush, an air spray, trowel, and concrete, brick and mason hand tools depending on the substrate to be employed. If desired, a second coating can be employed.

For most substrates, it is generally desirable that the thickness of the coating be about 1/32 to 3/8 inch, preferably ⅛ to ¼ inch depending on the substrate employed and the intended use. The preferred thickness for protecting steel and iron beams is from 1 inch to 2 inches.

The following examples are provided for illustrative purposes only and are in no way intended to limit the scope of the present invention.

EXAMPLE 1

A composition containing the following ingredients was prepared:
exfoliated vermiculite 168 g
silica: 14 g
clay: 14 g
mica: 28 g
biotite: 28 g
Elmer's aliphatic resin: 56 g
C.M.A. adhesive: 28 g
water: 28 g The exfoliated vermiculite, clay and silica and mica, i.e., the dry materials, were processed to obtain a uniform grain size of 0.15 to 0.25 mm.

The Elmer's aliphatic resin and C.M.A. adhesive were mixed in a separate container at room temperature until a thick consistency was obtained. The dry minerals were then added to the liquid, a small portion at a time, at room temperature to insure complete mixing of the ingredients.

The clay was obtained from the Contee Sand and Gravel Pit in Beltsville, Md. and has a yellowish brown color.

The composition was applied to the following substrates: red oak, white pine, aluminum foil, galvanized sheet metal, a 1" steel beam, a galvanized wire screen, an aluminum sheet, 4" polyurethane, 2" blue polyboard, 1" styrofoam, ¼" standard gypsum board, 3/8" wall panel wood and cardboard covered wall boards, in a thickness of about 1/32 to ⅛ of an inch.

The combustibility and heat testing was conducted using a propane below torch having a temperature of 2400° to 3200° F. The torch was applied for 30 seconds to 5 minutes to the substrate coated with the composition of the present invention.

Using the red oak and white pine wood, the fire test revealed that when the blow torch flame was applied to untreated pieces thereof, the wood immediately started to burn whereas, on wood treated with the composition of the present invention, which was torched with the flame 3 to 5 inches from the treated surface, the treated surface changed from grayish brown to a dark black-brown but no burning was observed.

When the blow torch flame was applied to an untreated piece of aluminum foil, the foil disintegrated instantaneously whereas, when the blow torch was applied to aluminum foil treated with the composition of the present invention, there was no change in the character of the foil. Similar results were obtained using the other substrates described above.

EXAMPLE 2

A composition containing the following ingredients was prepared:
 exfoliated vermiculite: 168 g
 silica: 14 g
 clay (Contee): 14 g
 mica: 28 g
 biotite: 28 g
 Elmer's aliphatic resin: 56 g
 water: 28 g The above dry materials were processed to obtain a uniform grain size of 0.15 to 0.25 mm. Next, the Elmer's aliphatic resin was applied to the surface of an aluminum foil or sheet. The resin was either sprayed on or brushed on. Next, the mixture of exfoliated vermiculite, silica, mica and biotite and clay was applied with an air spray tool on the wet adhesive and allowed to dry. Drying too, about 2–6 hours. The dry thickness was about 0.79 mm. The results obtained were identical to Example 1, i.e., the treated foil or sheet did not burn even when exposed to the blow torch for 30 seconds to 1 minute.

EXAMPLE 3

A composition containing the following ingredients was prepared:
 exfoliated vermiculite: 28 g
 silica: 14 g
 clay (Contee): 14 g
 mica: 28 g
 biotite: 28 g
 L.G.H. liquid hide glue: 28 g
 Elmer's aliphatic resin: 56 g
 C.M.A. adhesive: 28 g The biotite, exfoliated vermiculite, silica, clay and mica minerals were processed to a grain size of 0.15 to 0.25 mm and mixed in one container.

In a separate container, L.G.H. liquid hide glue, Elmer's aliphatic resin and C.M.A. adhesive were mixed at room temperature. Then, the contents in the two containers were mixed together at room temperature to obtain the composition of the present invention. The composition was applied to white pine, dry red oak, a steel rod (1" by ⅛"), polyurethane foam, and galvanized sheet metal, by means of a trowel.

The composition of the present invention was applied in thicknesses of about ⅛" on the above-identified substrates allowed to dry for 8 hours and then subjected to propane blow torch as described above. The results demonstrated that with all of the substrates treated with the composition of the present invention, no burning was seen when the blow torch was applied for 1 to 5 minutes.

EXAMPLE 4

A composition containing the following ingredients was prepared:
 exfoliated vermiculite: 168 g
 silica: 14 g
 clay (Contee): 14 g
 mica: 28 g
 biotite: 28 g
 Elmer's aliphatic resin: 56 g
 plaster of Paris: 80 g
 water: 28 g The above materials were processed in the same manner as Example 1 and applied, in the thickness of ⅛" to 1", to a galvanized wire screen by emersion coating, and dried for about 4 to 6 hours. The results obtained were identical to Example 1, i.e., the treated galvanized wire did not burn when exposed to the blow torch for 1 to 15 minutes.

EXAMPLE 5

Compositions containing the following ingredients, where only the particular type of clay employed was varied, were prepared:
 exfoliated vermiculite: 168 g
 silica: 14 g
 clay shown in Table 1: 14 g
 mica: 28 g
 biotite: 28 g
 Basf Corp. Acronal 290D Dispersion: 56 g
 C.M.A. adhesive: 28 g
 water: 28 g

TABLE 1

Clay Samples

| Sample Number | Source of Clays | Color |
|---|---|---|
| 1 | Walnut Lake, Michigan | Yellowish brown |
| 2 | Bloomfield Hills, Michigan | Tan |
| 3 | West Bloomfield, Michigan | Light brown |
| 4 | Worthington, Ohio | Yellowish brown |
| 5 | Worthington, Ohio | Yellowish brown |
| 6 | Columbus, Ohio | Brown |
| 7 | Grayson County, Virginia | Red |
| 8 | Dekalb County, Georgia | Reddish brown |
| 9 | Bradley County, Tennessee | Red |
| 10 | Cararrus County, N. Carolina | Red |
| 11 | Bedford County, Pennsylvania | Light brown |
| 12 | Petersbury, Virginia | Reddish brown |

TABLE 2

Clay Analysis

| Sample Number | Percent Organic Materials | Percent $Al_2O_3$ | Percent $SiO_2$ |
|---|---|---|---|
| 1 | 14.2 | 14.2 | 51.5 |
| 2 | 8.6 | 16.7 | 63.1 |
| 3 | 10.6 | 21.6 | 48.9 |
| 4 | 4.7 | 19.3 | 59.5 |
| 5 | 5.1 | 17.1 | 62.7 |
| 6 | 4.7 | 17.7 | 63.8 |
| 7 | 9.3 | 16.6 | 59.3 |
| 8 | 5.9 | 19.4 | 57.8 |
| 9 | 7.3 | 15.9 | 59.1 |
| 10 | 12.0 | 16.5 | 51.6 |
| 11 | 7.6 | 16.5 | 63.5 |
| 12 | 11.3 | 12.9 | 54.9 |

The materials were processed in the same manner as in Example 1 and applied, in a thickness of ¼" to white pine board and dried for about 24 hours. Then the coated boards were heated to 1832° to 2192° F. with an air-gas torch. All of the treated boards did not burn when exposed to the air-gas torch for 30 minutes, i.e., charring occurred but the coating provided protection by inhibiting the engress of oxygen to the surface of the wood. Further, although charring occurred, the integrity of the wood was maintained. In addition, no major differences were observed as to the amount of char under the coatings regardless of which clay was employed in the composition. This demonstrates that substitution of various clays does not effect the fire retardant properties of the composition.

EXAMPLE 6

Compositions containing the following ingredients, where the type of adhesive employed was varied, were prepared:

|  | (A) | (B) | (C) |
|---|---|---|---|
| exfoliated vermiculite | 168 g | 28 g | 168 g |
| silica | 14 g | 14 g | 14 g |
| clay (Bloomfield Hills) | 14 g | 14 g | 14 g |
| mica | 28 g | 28 g | 28 g |
| biotite | 28 g | 28 g | 28 g |
| Propiofan Vinyl Propionate Copolymer | 56 g | — | — |
| Eccotex 282 | — | 56 g | — |
| L.G.H. liquid hide glue | — | 28 g | — |
| C.M.A. adhesive | — | 28 g | — |
| Polidene Vinylidene Chloride Copolymer | — | — | 56 g |
| plaster of Paris | — | — | 80 g |
| water | 28 g | — | 28 g |

The materials were processed in the same manner as in Example 1 and applied, in a thickness of ¼″ to white pine board and dried for about 24 hours. Then the coated boards were heated to 1832° to 2192° F. with an air-gas torch. All of the treated boards did not burn when exposed to the air-gas torch for 30 minutes, i.e., charring occurred but the coating provided protection by inhibiting the engress of oxygen to the surface of the wood. Further, although charring occurred, the integrity of the wood was maintained. In addition, no major differences were observed as to the amount of char under the coatings regardless of which adhesive was employed in the composition. This demonstrates that substitution of various adhesives does not effect the fire retardant properties of the composition. These compositions also provided excellent water resistant properties and thus are advantageous when employed in high moisture environments.

The invention has been described with reference to specific embodiments thereof. However, it will be apparent to one skilled in the art that various changes and modifications can be made therein without departing from the spirit and scope thereof.

I claim:

1. A fire proofing composition consisting essentially of
   (1) 60 to 85 percent by weight exfoliated vermiculite,
   (2) 1 to 20 percent by weight blay,
   (3) 1 to 20 percent by weight silica,
   (4) 1 to 20 percent by weight mica,
   (5) 1 to 20 percent by weight biotite and
   (6) 5 to 20 percent by weight adhesive 2. The fire proofing composition as claimed in claim 1, additionally comprising
   (7) 1 to 20 percent by weight water as a thinning agent.

3. The fire proofing composition as claimed in claim 1, wherein said exfoliated vermiculite is employed in an amount of from 65 to 80% by weight.

4. The fire proofing composition as claimed in claim 1, wherein said clay is employed in an amount of from 1 to 5% by weight.

5. The fire proofing composition as claimed in claim 1, wherein said silica is employed in an amount of from 1 to 5% by weight.

6. The fire proofing composition as claimed in claim 1, wherein said mica is employed in an amount of from 1 to 5% by weight.

7. The fire proofing composition as claimed in claim 1, wherein said biotite is employed in an amount of from 1 to 5% by weight.

8. The fire proofing composition as claimed in claim 1, wherein said adhesive is employed in an amount of from 5 to 10% by weight.

9. The fire proofing composition as claimed in claim 1, wherein said components (1)–(5) are processed so as to have a grain size of from 0.15 to 0.25 mm.

* * * * *

UNITED STATES PATENT AND TRADEMARK OFFICE
CERTIFICATE OF CORRECTION

PATENT NO. : 4,851,044
DATED : July 25, 1989
INVENTOR(S) : Henry P. Stawinski

It is certified that error appears in the above-identified patent and that said Letters Patent is hereby corrected as shown below:

Column 3, line 41, delete "L.G.H." and insert therefor -- L.H.G. --;

Column 5, line 33, delete "L.G.H." and insert therefor -- L.H.G. --;
line 39, delete "L.G.H." and insert therefor -- L.H.G. --;

Column 7, line 16, delete "L.G.H." and insert therefor -- L.H.G. --;

Column 8, line 10, delete "blay" and insert therefor -- clay --.

Signed and Sealed this

Sixth Day of July, 1993

Attest:

MICHAEL K. KIRK

*Attesting Officer*  *Acting Commissioner of Patents and Trademarks*